July 14, 1925.
G. R. RODDY
1,546,316
CONVEYER
Filed May 28, 1920
3 Sheets-Sheet 3
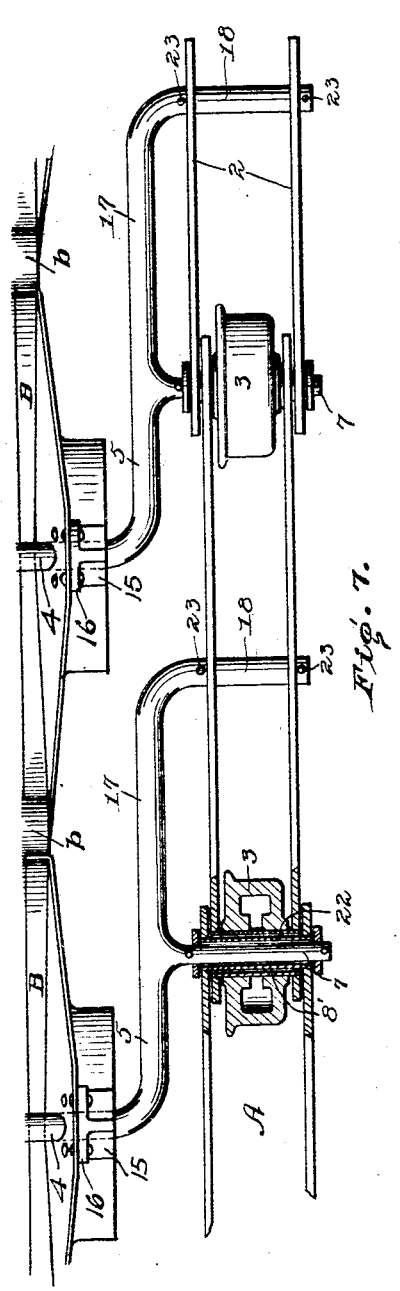
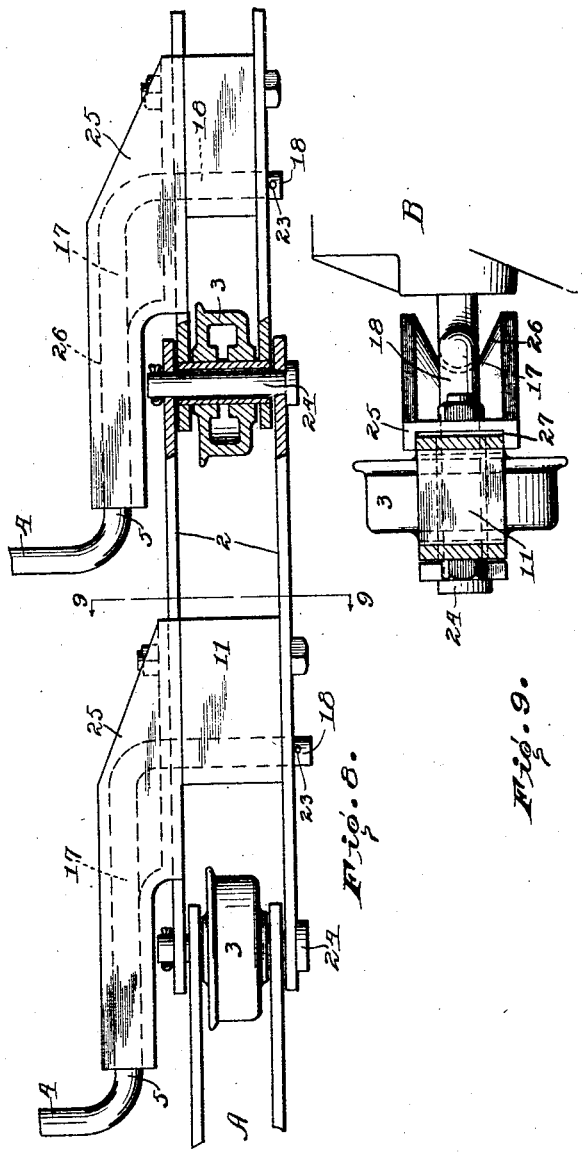
INVENTOR.
Gustav R. Roddy.
BY John S. Barket
ATTORNEY.

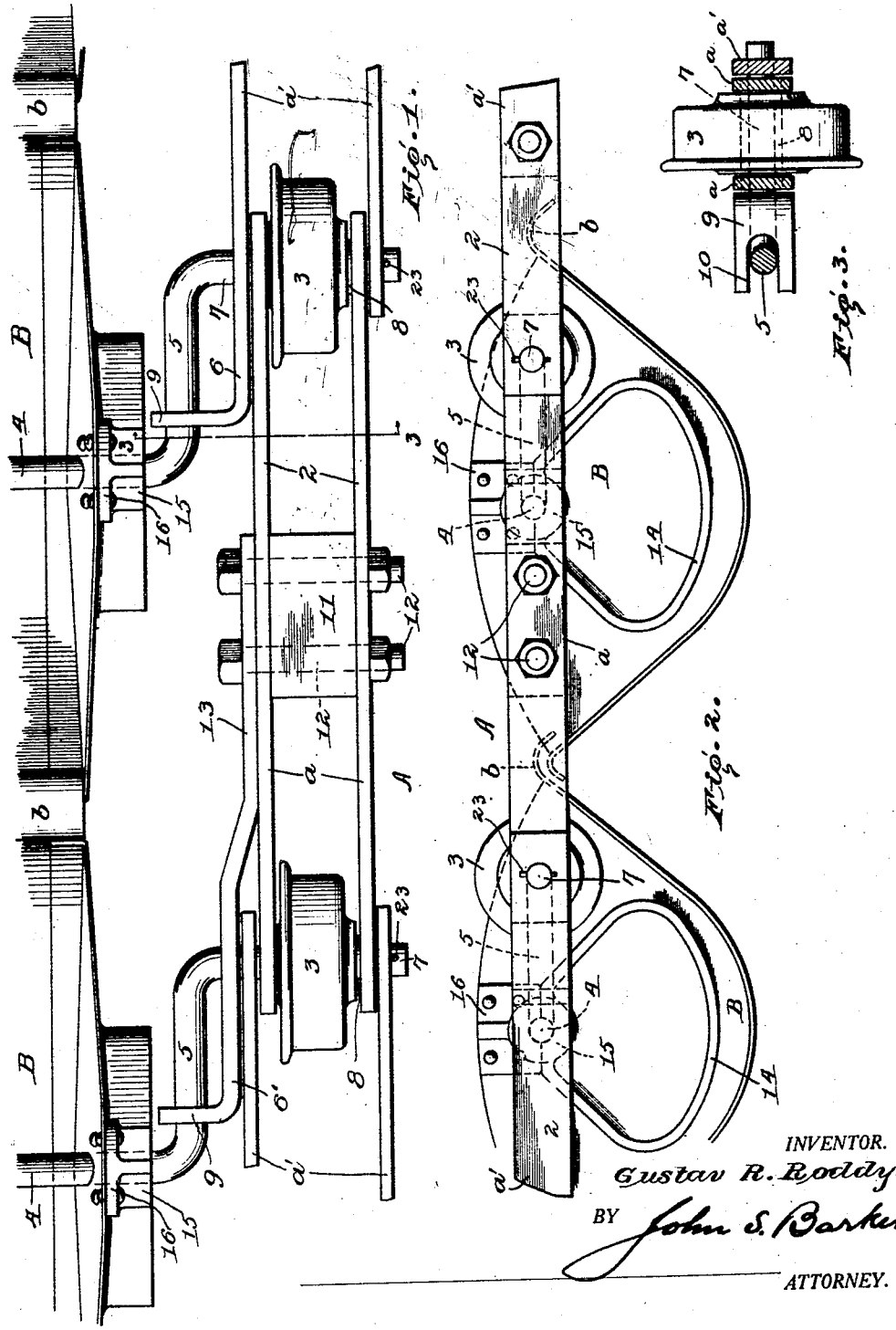

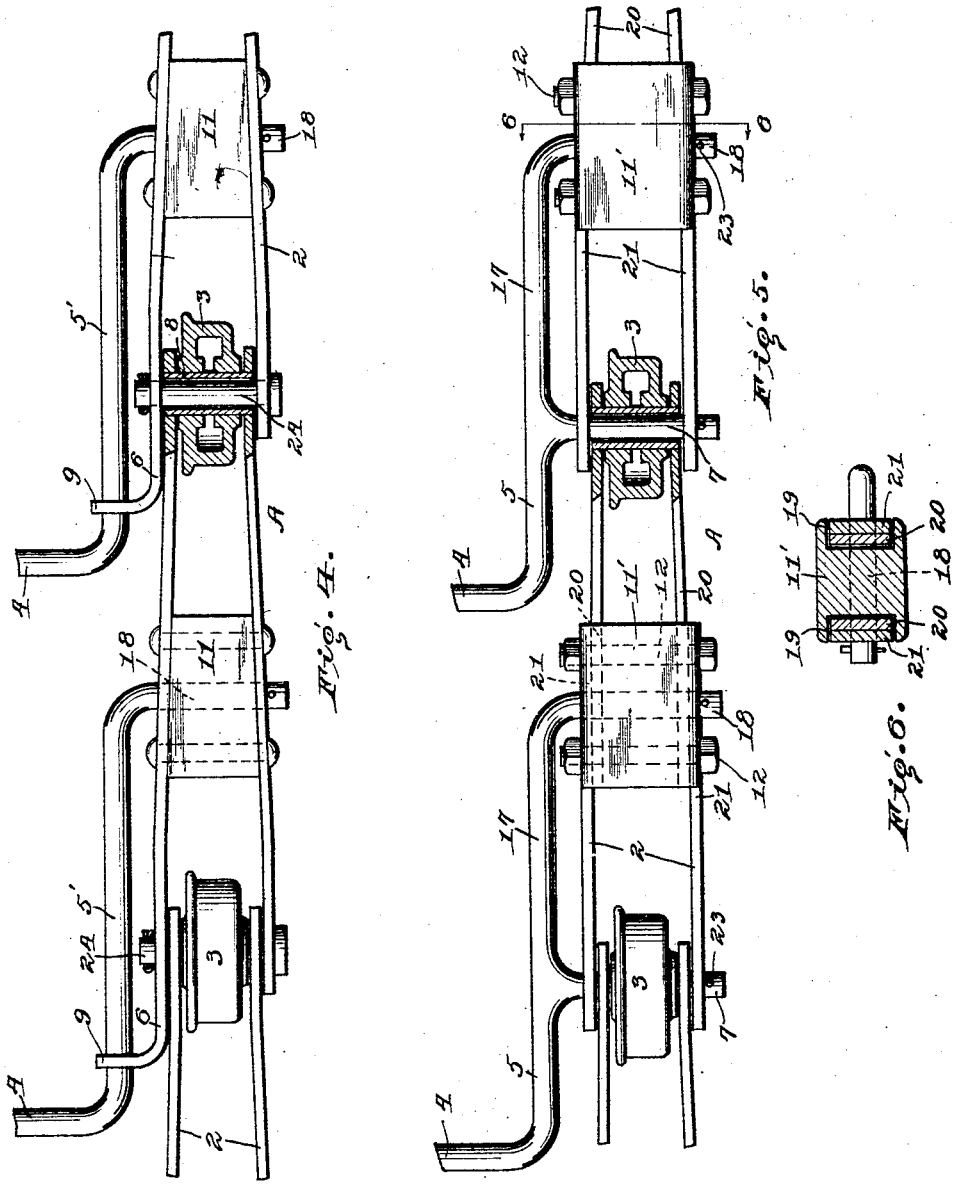

Patented July 14, 1925.

1,546,316

UNITED STATES PATENT OFFICE.

GUSTAV R. RODDY, OF MILWAUKEE, WISCONSIN, ASSIGNOR TO CHAIN BELT COMPANY, OF MILWAUKEE, WISCONSIN, A CORPORATION OF WISCONSIN.

CONVEYER.

Application filed May 28, 1920. Serial No. 384,967.

*To all whom it may concern:*

Be it known that I, GUSTAV R. RODDY, a citizen of the United States, residing at Milwaukee, in the county of Milwaukee and State of Wisconsin, have invented certain new and useful Improvements in Conveyers, of which the following is a specification.

This present invention relates to pivoted bucket conveyers. Conveyers of this type, in which a series of pivoted buckets are supported between a pair of parallel chains, which support, move and give direction to the buckets, are well known in the art. They possess advantages, such as great carrying capacity, and the ease with which they may be loaded and discharged. It is customary in operating conveyers of this type to cause them to follow a closed circuit of movement that usually includes a lower, horizontal run, an upper, horizontal run, and vertical or inclined runs connecting such horizontal runs. Where the edges of the buckets are formed with overlapping lips,—as is customary, in order to close the open spaces that would otherwise exist between the buckets, and through which material from a constantly delivering spout or loading device would spill were not some such provision made to prevent,—it is necessary to provide specially constructed or operating means to prevent the buckets from interfering with each other as they pass from one run to another in the course of their travels. One expedient that has been successfully used for this purpose is to extend the inner side bars of the opposite links of the chains by which a bucket is supported beyond the line of articulation of the said links, and to pivotally support the bucket in these extensions. So far as I am aware, in conveyers of the type just referred to the pivotal supports for the swinging buckets have been carried only by the inner side bars of the opposite links of the chains between which the buckets are located. This has resulted in supporting the load eccentrically, relative to the longitudinal central lines of the chains, and has caused uneven wear upon the joints of the chains, causing undue wear at these points with a tendency for the openings to become conical or larger at one end than the other.

It is in connection with conveyers of this general type that my invention is employed; and it consists of the improvements and novel arrangements and combinations of parts that I will now describe.

It has for its object to support the bucket and the load which it carries substantially equally from both side bars of the opposite links, and to arrange the mounting for the bucket and its connections with the links of the chains in such way that the weight of the load will be transferred uniformly to the bushings and bores of the chains and of the rollers with which they are provided, thus greatly increasing the life of the chain and improving its working qualities. These and other advantages of the invention will appear as it is described hereinafter.

Fig. 1 is a plan view, partly broken away, of a section of a conveyer embodying my invention in one of its forms.

Fig. 2 is an end view of parts shown in Fig. 1.

Fig. 3 is a sectional view on the line 3—3 of Fig. 1.

Figs. 4 and 5 are plan views, parts being broken away, of other forms of my invention.

Fig. 6 is a sectional view on the line 6—6 of Fig. 5.

Figs. 7 and 8 are plan views of still other forms of my invention.

Fig. 9 is a sectional view taken on the line 9—9 of Fig. 8.

In the accompanying drawings, A designates one of a pair of parallel sprocket chains, and B a series of buckets pivotally supported by the chains and located between them, being mounted so that they are free to swing on their supports, in order that they may maintain horizontal positions during the major portion of their circuit but be free to be tipped for the purpose of discharging their contents when this is desired. The chains of the conveyer engage with suitable supporting and directing wheels, certain of which serve as the driving means for giving motion to the conveyer, such wheels being disposed so as to cause the direction of the conveyer to be changed as may be desired. But as the type of conveyer to which my invention is applied is well known in the art I do not deem it necessary to show its supporting and directing wheels, and supporting tracks, nor the means for loading the buckets or tilting them to cause their discharge. Such means may be of well known or approved kind and form no part of my invention.

The buckets are provided with overlapping lips $b$ to close the spaces between them.

Each link of a chain A comprises a pair of side bars spaced apart for the admission of the teeth of the sprocket wheels with which the chain engages, and these side bars are, in the drawings, designated 2, whatever be their construction. At the joints of the chains, supported upon the cross-connecting parts between the side bars 2, are wheels or rollers 3 such as are commonly used in conveyers of this type.

4, 4, designate the cross bars upon which the buckets B are pivotally hung. These bars are supported at their opposite ends by corresponding links of the opposite chains A, and serve not only as supports for the buckets but also to maintain the chains parallel with each other and in proper spaced relationship. Each bar 4 is provided at each end with an angular portion 5 that extends forward from the main central part of the rod. I use the term "forward" here to indicate the direction in which the conveyer moves under ordinary working condition. Each extension 5 is so connected with a chain link that each side bar 2 thereof supports the cross bar equally. This may be accomplished in various ways. Thus, as represented in Figs. 1 and 2, each angular portion of the bar 4 is provided with an outwardly extending part 7 that passes through the overlapping side bars of adjacent links and serves as the connecting pin at this joint of the chain. In the chain represented in Fig. 1, the side bars of the links $a$ are connected by sleeves 8 secured fast in the side bars. Through these sleeves, and through the overlapping side bars of the links $a'$ pass the pins 7. The rollers or wheels 3 are supported upon the sleeves 8, turning freely thereon.

The inner side bars 2 of the opposite links by which a bucket-supporting cross bar 4 is carried are extended rearward beyond the joints uniting such links with the next links to the rear, as represented at 6, and the ends of these extensions are turned inwardly, at 9, to engage with the angular portions 5 of the cross bar, near the junction of the parts 4 and 5, being for this purpose forked, as represented at 10. The side bars of the links supporting a bar 4 are firmly connected with each other at points between their joints, as by means of the blocks 11, and connecting bolts 12.

The construction which I have described furnishes for each bucket an eccentric mounting,—eccentric relative to the axis of the joints of articulation of the opposite links—by reason of the angular form of the bar; and it also gives the cross bar a support at each end that is central, longitudinally, to the chain with which it is connected, by reason of the ends 7 of the bar, constituting the connecting pins for the links, being seated equally in the opposite side bars of the united links, and also because the two side bars of each supporting link are rigidly united together by the connecting blocks 11, and the bar 4 is connected with this block through the extension 6.

In the form of chain link designated $a'$ the extension 6 is integral with the inner side bar 2, but the extensions 6' for the links $a$ are separate from the side bars thereof, being the offset rear ends of plates 13 that are bolted to the inner sides of the side bars 2 by means of the bolts 12 that pass through and hold in place the connecting blocks 11.

It will be seen that the chain represented in Figs. 1 and 2 is formed of flat bar metal and that the side bars of the links are straight and parallel with each other throughout, a form of chain that is simple in construction and may be cheaply manufactured.

The chain represented in Fig. 4 is also formed of flat bar metal, the side bars thereof being not parallel, but nearer together at the forward ends of the links than at the rear ends, so that at each joint the side bars of the forward or leading link lie outside of the ends of the side bars of the following link. With a chain of this kind it is feasible and preferable to form all of the extensions 6, from which the cross bars supporting the buckets are supported, integral with the inner side bars as shown.

14 indicates the dumping cams with which the swinging buckets are provided, they being represented as secured to the ends of the buckets, as is common practice in apparatus of this kind. There are preferably open seats 15 formed in the upper portions of the dumping cams 14, and the rod bearings are completed by removable blocks 16 adapted to set over the bearings 15 and to be secured in place in any suitable manner, as by bolts.

In Fig. 4 the angular portions 5' of the bucket-supporting rod are longer than the corresponding portions 5 of Figs. 1 and 2 so that they extend forward beyond the joints uniting the bucket-supporting links with those links next to the rear, and the pins 7 are omitted, instead of them connecting pins 24 of well known form being employed to unite the links. The forward ends of the angular portions 5' are bent outwardly at right angles to form arms 18 that are seated in the opposite side bars of the links and in the blocks 11 uniting such links.

A construction such as shown in Fig. 4 gives to the cross bar 4 a firmer and better support than when constructed as shown in Fig. 1, and for that reason is in some cases to be preferred.

In Fig. 5 I have represented still another manner of supporting the cross bar 4, and one which for some purposes I prefer to those that have already been described. It combines the features of the forms of invention shown in Figs. 1 and 4, that is to say, it has an angular extension 17 in prolongation of the extension 5 carrying the bearing arm 18, and it also has the connecting pin 7, the parts 7 and 18 being parallel with each other. With this construction the extensions 6 or 6' carried by the side bars of the links, may be dispensed with, the extensions 17 of the supporting cross bar serving the same purpose as do the link extensions 6, that is to say, they hold the cross bar 4 rigid with reference to its supporting links and prevent it from turning about the pins 7 as an axis. In Fig. 5 I also show a chain different from that illustrated in the other views in that the side bar of each link is formed of two parts 20, 20 and 21, 21. These parts overlap each other at the middle of the link where they lie in recesses 19 formed in the sides of the connecting blocks 11', where they are securely held by the bolts 12. This arrangement forms links the side bars of which are offset, the parts 20 lying inside the parts 21 at the joints of the links, as clearly represented in the drawings.

In Fig. 7 I have illustrated a form of my invention in which the intermediate connecting blocks 11 or 11' are omitted. This is feasible where the bucket-supporting cross bar 4 is provided with the extensions 17, 18. As represented in this view the parts 18 pass through and are seated in the opposite cross bars of the links, where they are secured by pins 23. This arrangement affords a good support for the bar 4 in both the outer and inner side bars of each supporting link thus supporting the load to be carried centrally from each chain. The joints of the chain shown in Fig. 7 are likewise different from those represented in the other views in that I employ sleeves 8' to unite the side bars 2 that lie innermost at the joint, and hollow pins 22 seated fast in and uniting the outer overlapping side bars of the other links at the joints. The pin 7 passes through the hollow pin 22 and articulates therein, while the pin 22 passes through and articulates in the sleeve 8', on which latter turns the wheel or roller 3. In this arrangement the wear incident to the articulations of the chain is nearly all taken by the two sleeves or hollow connecting pins 8' and 22. It will be understood that the form of joint here shown may be used with any form of chain that I have illustrated, and I do not wish to be understood that it is particularly limited for use in connection with the specific form of chain shown in Fig. 7.

In Figs. 8 and 9 I show a form of the invention in which the pins 7 are dispensed with, as in the Fig. 4 construction already described, and where the integral extensions of the side bars 6 are also dispensed with. Instead of these latter parts, the extensions 6, I employ, in order to hold the supporting bars rigidly with reference to the links that carry them, the separate pieces 25. These are bolted to the inner faces of the inner side bars 2 of the supporting links and extend rearwardly, past the joints of the links, so as to have engagement with the supporting bar near the junction of the parts 4 and 5 thereof. The pieces 25 are formed on their inner faces with grooves or seats 26 in which lie the angular extensions 17 of the cross bar. The ends 18 of these extensions pass through the pieces 25 and are seated in the opposite side bars of the carrying links in the way already described. The sides of the pieces 25 that bear against the side bars of the links may be formed with channels 27 to receive said side bars and thus furnish rigid connections between such pieces 25 and the links to which they are attached.

It will be seen from the foregoing description taken in connection with the drawings, that in each form of the invention the connecting and bucket-supporting cross bars are each located beyond and outside (in the arrangements shown to the rear) of the joints of the links that directly support such bars, and that each cross bar is so connected with its supporting links that it is rigidly maintained in the position beyond the joints of the chain just referred to. This location of the bucket-supporting cross rods insures that the buckets shall properly separate from each other as they turn from one run to another, for instance, from the lower run to the upward moving vertical run, thus permitting them to separate without interference from their overlapping edges. This method of operation of an overlapping pivoted bucket conveyer I do not claim to be my invention.

It will be observed that the portions, 5, of the rods on which the conveying elements are supported extend beyond the ends of the links, and are detachably connected therewith, thus permitting any bucket-supporting part that becomes broken or worn out to be easily separated from the chain and replaced. In the construction shown in Figs. 1 and 2 the bucket-supporting rod may be separated from the chain by removing the cotter or holding pins 23 and slipping the projecting portions 7 of the rod from their seats in the chain. So, too, the plates 13, which extend beyond the ends of the links and engage with the arms 5 of the supporting rods, are detachably connected with the chain links and may be removed whenever it is desired to detach one of the supporting rods. In the construction shown in each of the other views the bucket-supporting parts are formed with arms that are detachably connected with the links of the chain, some in one way and some in another, as is apparent from the foregoing description and the accompanying drawings taken in connection therewith. It will also be seen that in certain forms of my invention, as for instance, those illustrated in Figs. 1 and 2, 5 and 7, the crank arms 5 connected with the supporting rods 4 are provided with parts that extend through the pivotal connections of the links, and serve as elements of the detachable connections between the supporting rods and the links of the chain.

In certain forms of my invention there are supporting parts that extend from the links and interengage with the crank arms of the supporting rods and serve to assist in holding the latter in proper working position, which interengaging parts have separable attachment to the chain links. Thus the plate 13 with its extension 6' and forked end 9, is one example of such an interconnecting part attached to the chain; and the part designated 25 in the construction shown in Fig. 8 is another.

The conveyer described, in its novel features, may be easily and cheaply constructed and provides for supporting and mounting the cross bars on which the buckets are hung in such manner that the weight of the load being conveyed is carried back and applied to the chains in such manner that the wear is uniformly distributed to both sides of both chains. In other words the wear upon the links is as though the load were supported directly at the center, transversely, of each chain.

While the invention described in this application is particularly adapted for use in connection with pivoted bucket conveyers, the buckets of which are supported between two parallel lines of chains and have overlapping edges, it is evident that it is not limited in its useful applications to a conveyer of this type, the drawings indicating that the rods 4 might be supported entirely by one line of chain, and it is equally true that such rods might serve as supports for other moving or conveying elements than buckets like those indicated in Figs. 1 and 2.

What I claim is:—

1. The combination with a pair of sprocket chains and pivoted conveyer buckets with overlapping edges located between the chains, of cross rods on which the buckets are pivotally supported, each located outside of an axis of articulation of the particular links of the chain supporting the rod, and connections between the rods and the chains rigidly uniting the former with both the outside and the inside bars of the links with which the rods are severally directly connected.

2. The combination with a pair of sprocket chains and pivoted conveyer buckets with overlapping edges located between the chains, of cross rods on which the buckets are pivotally supported, the ends of the rods being bent to form angular portions and the transverse bucket-supporting portions of the rods being each located beyond the axis of articulation of the links directly supporting the rod, and connections between the rods and the chains, engaging with the rods near the junctions of the transverse bucket-supporting portions and the angular portions thereof, and rigidly united with both the outside and inside bars of the supporting links.

3. The combination with a pair of sprocket chains and conveyer buckets with overlapping edges located between the chains, of cross rods on which the buckets are pivotally supported, the rods having angular portions with outwardly extending parts that serve as connecting pins for the links of the chain, the cross bucket-supporting parts of the rods being each to one side of the chain joints of which the said pins are the axes, and means for rigidly connecting each cross rod with both side bars of one of the links united by the said connecting pins.

4. The combination with a pair of parallel sprocket chains and conveyer buckets with overlapping edges located between the chains, of cross rods on which the buckets are pivotally supported uniting the chains, each rod being located to the rear of the chain joints of the opposite links supporting it, and having at its ends angular extensions extending forwardly beyond the said chain joints and connected with both side bars of the links in the opposite chains directly supporting the said rod.

5. The combination with a pair of parallel sprocket chains and conveyer buckets with overlapping edges located between the chains, of cross rods uniting the chains, on which the buckets are pivotally supported, each cross rod being located beyond the ends of the chain links directly carrying it and having at its ends angular portions extending toward the transverse center of the said carrying links, from which angular portions project arms that are seated in both side bars of the carrying links.

6. The combination of a pair of parallel sprocket chains and conveyer buckets with overlapping edges located between the chains, of cross rods uniting the chains, on which the buckets are pivotally supported, each cross rod being located beyond the ends of the chain links directly carrying it and having at its ends angular extensions with outwardly projecting arms seated in both side bars of the links, the inner side bars of the supporting links being extended beyond the joints of articulation of the links and engaging with the cross rod to hold it against turning relative to the supporting links.

7. The combination with a sprocket chain, of supporting rods carried thereby, each located beyond the axis of articulation of the link of the chain supporting the rod, and connections between the rods and chain rigidly uniting the former with both the outer and the inner side bars of the links with which the rods are severally directly connected.

8. The combination with a sprocket chain, of supporting rods on which are pivoted conveying elements, the rods being bent and the parts thereof by which the conveying elements are directly supported being each located beyond the axis of articulation of the link directly supporting the rod, and connections between the rods and the chain engaging with the rods near the angles thereof, and rigidly united with both the outer and inner side bars of the links directly supporting the rods.

9. The combination with a sprocket chain, of rods carried thereby and adapted to serve as supports to which are pivotally attached conveying elements, each rod being located to the rear of the axial line of the chain joint of the link supporting it and being formed with an angular portion extending forwardly beyond such chain joint where it is connected with both side bars of the link directly supporting it.

10. In a bucket conveyer, the combination of links pivotally connected together, crank arms for supporting buckets, and means through the pivotal connections of the links for detachably connecting said arms to the links.

GUSTAV R. RODDY.